3,260,695
STRESS CRACK RESISTANT POLYETHYLENE COMPOSITION CONTAINING ZINC-2-BENZAMIDOTHIOPHENATE
George L. Bata, Montreal, Quebec, and Donald C. Fraser, North Vancouver, British Columbia, Canada, assignors to Union Carbide Canada Limited, Ontario, Canada, a corporation of Canada
No Drawing. Filed June 4, 1962, Ser. No. 199,647
4 Claims. (Cl. 260—41)

This invention relates to improvements in the stress-crack resistance of ethylene polymers.

Normally solid polymers of ethylene in molded or extruded form when subjected to prolonged stress, and particularly when in contact with certain compounds, will suddenly crack after a given length of time. Such failure has been variously referred to as "embrittlement," "stress-corrosion," "notch-bend resistance," "crazing" and "environmental stress-cracking." For purposes of brevity and consistency, the term "stress-cracking" will be hereinafter employed as a preferred descriptive term for this phenomenon.

Among the compounds recognized as being active environment for causing stress-cracking of polyethylene subjected to prolonged stress are aliphatic and aromatic liquid hydrocarbons, alcohols, organic acids, ester-type plasticizers, vegetable oils, animal oils, mineral oils, metallic soaps, sulfated and sulfonated alcohols, alkanolamines, polyglycol ethers, sodium and potassium hydroxide, certain rubbers and silicone fluids; cf. De Coste, Malm and Wallder, "Industrial and Engineering Chemistry," 43, 117–121 (1951).

It has been proposed to improve stress-cracking resistance of polyethylene by incorporating therein minor amounts of polyisobutylene or butyl rubber. Such modifiers offer only limited improvement and with increasing concentration tend to seriously reduce the rigidity of the polyethylene.

It has now been found that without any substantial impairment to rigidity or tensile strength, the stress-cracking resistance of a normally solid polyethylene is unexpectedly increased to a high degree in many instances by incorporating in the polyethylene relatively small amounts of zinc-2-benzamidothiophenate, a compound with the following structural formula:

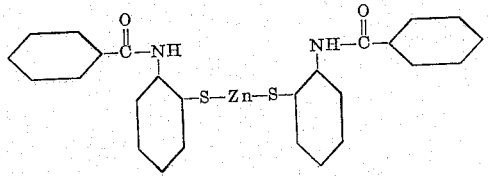

The addition of this compound increases stress-cracking resistence not only in polyethylene alone, but in polyethylene to which carbon black has been added. Polyethylene can also contain other conventional additives such as anti-oxidants.

Zinc-2-benzamidothiophenate is most effective in increasing stress-cracking resistance in polyethylenes with low melt indices. Improvement has been noted with polyethylenes of melt index as low as 0.01 and substantial improvement is achieved with polyethylenes having melt indices up to 2.5 or 3. Minor improvement is achieved by adding zinc-2-benzamidothiophenate to polyethylenes with melt indices above 3 or 4 and up to as high as 20.

The quantity of zinc-2-benzamidothiophenate required to achieve stress-cracking resistance is not narrowly critical, but at least about 2 percent by weight based on the weight of the mixture should be employed. The optimum concentration is between about 3 percent and 5 percent by weight. Higher concentrations also increase the stress-cracking resistance, but the use of such larger quantities is not ordinarily economically feasible or desirable.

The zinc-2-benzamidothiophenate can be incorporated into polyethylene by any common mixing operation. Thus a roll mill, a Banbury mixer or the like can be employed.

*Example I*

Polyethylene compositions were prepared by fluxing, on heated rolls, a commercial, normally solid polyethylene having a number average molecular weight of 11,000, a density of 0.919 at 23° C., a softening temperature of 110° C., and a melt index value of 2.13 decigrams per minute by the method of ASTM Test D–1238–52T, with various percentages of zinc-2-benzamidothiophenate. The mixing temperature of the composition averaged between 115° C. and 150° C. Upon obtaining a visibly uniform hot plastic sheet on the rolls, usually within five to 15 minutes mixing time, the sheet was removed and compression molded at 175° C. and under a pressure of 600 pounds per square inch into 8-inch square plaques, having a thickness of 0.125 inches. The plaques were then placed in an oven at 135±5° C. and retained at that temperature for one hour ±10 minutes. After one hour aging at this condition, the temperature in the oven was lowered at a rate of 5° C.±0.2° C. per hour until the plaques reached a temperature of 50° C. The plaques were then cut by a sharp blanking die into specimens 1.5 x 0.5 inches. The specimens were tested for stress cracking resistance by immersion in Igepal CA–630, which is an alkyl aryl polyethylene glycol manufactured by the General Dyestuff Corporation, New York, and is a well-known stress cracking reagent. The procedure followed from this point on corresponds to that described in ASTM Bulletin, pages 25–26, December 1956. The samples were tested for tensile strength according to ASTM Test D–412. The results were as follows:

| Base Resin Melt Index, dg./min. | Percent By Weight Zinc-2-benzamidothiophenate | Crack Resistance, F50[1] hours | Tensile Strength, p.s.i. | Elongation, percent |
|---|---|---|---|---|
| 2.13 | | .42 | 1,750 | 970 |
| 2.13 | 3 | 2.25 | 1,300 | 810 |
| 2.13 | 6 | 11.50 | 1,300 | 730 |
| 2.13 | 10 | >250 | 1,150 | 770 |

[1] Designates the time in hours when 50 percent of the test specimens fail by crack developments. In the run with 10 percent zinc-2-benzamidothiophenate, the test was discontinued after 250 hours without 50 percent failure.

*Example II*

Polyethylene compositions were prepared by fluxing, on heated rolls, a commercial, normally solid polyethylene having a number average molecular weight of 10,000, a density of 0.923 at 23° C., a softening temperature of 110° C., and a melt index value of 4.40 decigrams per minute by the method of ASTM Test D–1238–52T, with and without 4 weight percent of zinc-2-benzamidothiophenate. The mixing temperature of the composition averaged between 115° C. and 150° C. Upon obtaining a visibly uniform hot plastic sheet on the rolls, usually within five to 15 minutes mixing time, the sheet was removed and compression molded at 175° C. and under a pressure of 600 pounds per square inch into 8-inch square plaques, having a thickness of 0.125 inch. The plaques were then placed in an oven at 135±5° C. and retained at that temperature for one hour ±10 minutes. After one hour aging at this condition, the temperature in the oven was lowered at a rate of 5° C.±0.2° C. per hour until the plaques reached a temperature of 50° C. The plaques were then cut by a sharp blanking die into specimens 1.5 x 0.5 inches. The specimens were tested for stress cracking resistance by immersion in Igepal CA-630, which is an alkyl aryl polyethylene glycol manufactured by the General Dyestuff Corporation, New York, and is a well-known stress cracking reagent. The procedure followed from this point on corresponds to that described in ASTM Bulletin, pages 25–26, December 1956. The samples were tested for tensile strength according to ASTM Test D-412. The results were as follows:

| Base Resin Melt Index, dg./min. | Percent By Weight Zinc-2-benzamido-thiophenate | Crack Resistance, F50[1] hours | Tensile Strength, p.s.i. | Elongation, percent |
|---|---|---|---|---|
| 4.40 | | .18 | 1,510 | 820 |
| 4.40 | 4 | .33 | 1,230 | 160 |

[1] Designates the time in hours when 50 percent of the test specimens fail by crack developments.

Example III

Polyethylene compositions were prepared by fluxing, on heated rolls, a commercial, normally solid polyethylene having a number average molecular weight of 14,000, a density of 0.923 at 23° C., a softening temperature of 110° C., and a melt index value of .21 decigram per minute by the method of ASTM Test D-1238-52T, with and without 4 weight percent of zinc-2-benzamidothiophenate. The mixing temperature of the composition averaged between 115° C. and 150° C. Upon obtaining a visibly uniform hot plastic sheet on the rolls, usually within five to 15 minutes mixing time, the sheet was removed and compression molded at 175° C. and under a pressure of 600 pounds per square inch into 8-inch square plaques, having a thickness of 0.125 inches. The plaques were then placed in an oven at 135±5° C. and retained at that temperature for one hour ±10 minutes. After one hour aging at this condition, the temperature in the oven was lowered at a rate of 5° C.±0.2° C. per hour until the plaques reached a temperature of 50° C. The plaques were then cut by a sharp blanking die into specimens 1.5 x 0.5 inches. The specimens were tested for stress cracking resistance by immersion in Igepal CA-630, which is an alkyl aryl polyethylene glycol manufactured by the General Dyestuff Corporation, New York, and is a well-known stress cracking reagent. The procedure followed from this point on corresponds to that described in ASTM Bulletin, pages 25–26, December 1956. The samples were tested for tensile strength according to ASTM Test D-412. The results were as follows:

| Base Resin Melt Index, dg./min. | Percent By Weight Zinc-2-benzamido-thiophenate | Crack Resistance, F50[1] hours | Tensile Strength, p.s.i. | Elongation, percent |
|---|---|---|---|---|
| .21 | | 23 | 2,430 | 1,060 |
| .21 | 4 | >336 | 2,520 | 1,020 |

[1] Designates the time in hours when 50 percent of the test specimens fail by crack developments. In the run with 4 percent zinc-2-benzamidothiophenate, the test was discontinued after 336 hours without 50 percent failure.

Example IV

Polyethylene compositions having excellent resistance to stress cracking were prepared by fluxing, on heated rolls, a commercial, normally solid polyethylene having a number average molecular weight of 11,000, a density of 0.919 at 23° C., a softening temperature of 110° C., and a melt index value of 2 decigrams per minute by the method of ASTM Test D-1238-52T, the compositions including the polyethylene alone, the polyethylene with 4 weight percent zinc-2-benzamidothiophenate added, the polyethylene with 2.6 weight percent carbon black added and the polyethylene with both 2.6 weight percent carbon black and 4.5 weight percent zinc-2-benzamidothiophenate added. The mixing temperature of the composition averaged between 115° C. and 150° C. Upon obtaining a visibly uniform hot plastic sheet on the rolls, usually within five to 15 minutes mixing time, the sheet was removed and transferred to a hydraulic press where it was compression molded at 175° C. and under a pressure of 600 pounds per square inch into 8-inch square plaques, having a thickness of 0.125 inch. The plaques were then cut by a sharp blanking die into specimens 1.5 x 0.5 inches. The specimens were tested for stress cracking resistance by immersion in Igepal CA-630, which is an alkyl aryl polyethylene glycol manufactured by the General Dyestuff Corporation, New York, and is a well-known stress cracking reagent. The test procedure employed corresponds with that described in ASTM Bulletin, pages 25–26, December 1956. The results were as follows:

| Base Resin Melt Index, dg./min. | Percent By Weight Additives | Crack Resistance, F50[1] hours | Tensile Strength, p.s.i. | Elongation, Percent |
|---|---|---|---|---|
| 2.0 | | .4 | | |
| 2.0 | 4 zinc-2-benzamidothiophenate. | >750 | | |
| 2.0 | 2.6 Carbon Blk | <1 | | |
| 2.0 | 2.6 Carbon Blk +4.5 zinc-2-benzamidothiophenate. | >1,500 | | |

[1] Designates the time in hours when 50 percent of the test specimens fail by crack developments. In the run with 4 percent zinc-2-benzamidothiophenate, the test was discontinued after 750 hours without 50 percent failure. In the run with 2.6 percent carbon black +4.5 percent zinc-2-benzamidothiophenate, the test was discontinued after 1,500 hour without 50 percent failure.

It will be noted from the examples that the addition of zinc-2-benzamidothiophenate increases many fold the stress-cracking resistance of polyethylene. It will be further seen that this effect is not limited to polyethylene alone. It also occurs with polyethylene containing additives such as carbon black. The effect persists with the addition of up to 3 percent carbon black and with normally added quantities of other additives and fillers such as 2,6-di-tert-butyl-p-cresol, hydroquinone monobenzyl ether, N,N'-diphenyl-p-phenylenediamine, and 4,4'-thio-bis-6-t-butyl-m-cresol and the like. The relatively high increases in stress-cracking resistance in Example IV as compared to Examples I, II and III is attributable to the fact that the test procedure applied in Example IV is less rigorous than that in Examples I through III.

The polyethylene compositions of the invention are particularly useful as extrusion coatings on wire in the production of insulated wires and cables having in service use superior resistance to stress-cracking than unmodified polyethylene.

Although the invention has been herein shown and described in what is considered to be the most practical and preferred embodiments, it is recognized that departures may be made therefrom within the scope of the invention, which is not limited to the details herein disclosed, but is to be accorded the full scope of the appended claims, so as to embrace any and all equivalent compositions and process for producing such compositions.

What is claimed is:

1. A polyethylene composition characterized by resistance to stress cracking consisting essentially of a normally solid low density homopolymer of ethylene, said polymer having a melt index from 0.01 to about 4 and being prone to stress cracking, in admixture with at least 2 percent by weight of said composition of zinc-2-benzamidothiophenate.

2. A polyethylene composition characterized by resistance to stress cracking consisting essentially of a normally solid low density homopolymer of ethylene, said polymer having a melt index from 0.01 to about 4 and being prone to stress cracking, in admixture with from about 3 percent to about 5 percent by weight of said composition of zinc-2-benzamidothiophenate.

3. A polyethylene composition containing carbon black characterized by resistance to stress cracking consisting essentially of a normally solid low density homopolymer of ethylene, said polymer having a melt index from 0.01 to about 4 and being prone to stress cracking, in admixture with at least 2 percent by weight of said composition of zinc-2-benzamidothiophenate.

4. A polyethylene composition containing carbon black characterized by resistance to stress cracking consisting essentially of a normally solid low density homopolymer of ethylene, said polymer having a melt index from 0.01 to about 4 and being prone to stress cracking, in admixture with from about 3 percent to about 5 percent by weight of said composition of zinc-2-benzamidothiophenate.

References Cited by the Examiner

UNITED STATES PATENTS

| | | | |
|---|---|---|---|
| 2,787,621 | 4/1957 | Hook et al. | 260—347.2 |
| 3,012,016 | 12/1961 | Kirk et al. | 260—41 |

FOREIGN PATENTS

| | | |
|---|---|---|
| 532,665 | 1/1941 | Great Britain. |

MORRIS LIEBMAN, *Primary Examiner.*

LESLIE H. GASTON, *Examiner.*

K. B. CLARKE, J. S. WALDRON, *Assistant Examiners.*